US012568351B2

(12) United States Patent
Nguyen et al.

(10) Patent No.: US 12,568,351 B2
(45) Date of Patent: Mar. 3, 2026

(54) SYSTEMS AND METHODS FOR BYPASSING SERVICE CONTINUITY GATEWAYS BASED ON ROAMING

(71) Applicant: Verizon Patent and Licensing Inc., Basking Ridge, NJ (US)

(72) Inventors: John Cao Vinh Nguyen, Trophy Club, TX (US); Bibi M. Hakimzadeh, Fort Worth, TX (US); Toby Varughese John, Murphy, TX (US); Danysel Barthelme, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 257 days.

(21) Appl. No.: 18/500,731

(22) Filed: Nov. 2, 2023

(65) Prior Publication Data
US 2025/0150804 A1    May 8, 2025

(51) Int. Cl.
*H04W 8/08*        (2009.01)

(52) U.S. Cl.
CPC ................................... *H04W 8/082* (2013.01)

(58) Field of Classification Search
CPC ...................................................... H04W 8/082
See application file for complete search history.

(56) References Cited

U.S. PATENT DOCUMENTS

2024/0259913 A1 *    8/2024    Haustein ............... H04W 76/15

* cited by examiner

*Primary Examiner* — Curtis B Odom

(57) ABSTRACT

In some implementations, a call session control function (CSCF) may identify information associated with a user equipment (UE). The CSCF may determine, based on the information, whether the UE is roaming in a circuit switched mobility network. The CSCF may transmit signaling associated with delivering a call to the UE, wherein the signaling bypasses a service continuity gateway (SCG) on a call delivery path when the UE is not roaming in the circuit switched mobility network and the signaling traverses the SCG on the call delivery path when the UE is roaming in the circuit switched mobility network.

19 Claims, 11 Drawing Sheets

1000 ⟶

1010 — Identify, by a call session control function (CSCF), information associated with a user equipment (UE)

1020 — Determine, by the CSCF and based on the information, whether the UE is roaming in a circuit switched mobility network 1030 — Transmit, by the CSCF, signaling associated with delivering a call to the UE that bypasses a service continuity gateway (SCG) on a call delivery path when the UE is not roaming in the circuit switched mobility network and traverses the SCG on the call delivery path when the UE is roaming in the circuit switched mobility network

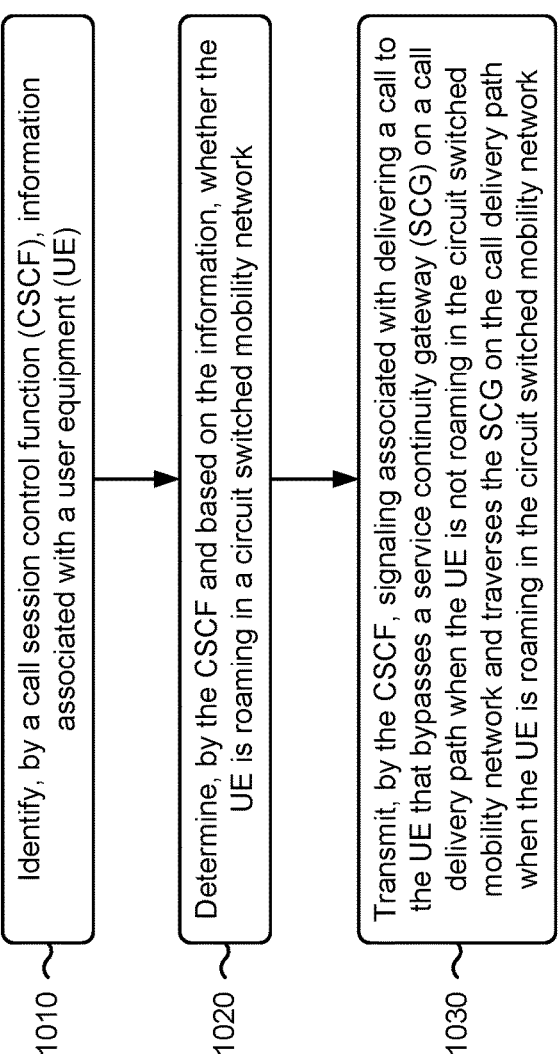

1010  Identify, by a call session control function (CSCF), information associated with a user equipment (UE)

1020  Determine, by the CSCF and based on the information, whether the UE is roaming in a circuit switched mobility network 1030  Transmit, by the CSCF, signaling associated with delivering a call to the UE that bypasses a service continuity gateway (SCG) on a call delivery path when the UE is not roaming in the circuit switched mobility network and traverses the SCG on the call delivery path when the UE is roaming in the circuit switched mobility network

SYSTEMS AND METHODS FOR BYPASSING SERVICE CONTINUITY GATEWAYS BASED ON ROAMING

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE).

BRIEF DESCRIPTION OF THE DRAWINGS

FIG. 10 is a flowchart of an example process associated with bypassing an SCG based on roaming status.

DETAILED DESCRIPTION OF EXAMPLE EMBODIMENTS

The following detailed description of example implementations refers to the accompanying drawings. The same reference numbers in different drawings may identify the same or similar elements.

An SCG may act as a gateway between a circuit switched mobility network and an IMS network. The SCG may support anchoring, domain transfer, and call delivery for dual mode user equipments (UEs). A call session control function (CSCF) may send inbound/terminated calls to the SCG. The SCG may determine whether a call should be delivered as a voice over IP (VOIP) call or as a circuit switched call. Although a code division multiple access (CDMA) network may be decommissioned and the SCG may no longer need to deliver calls to the CDMA network, the SCG may still need to deliver calls to a global system for mobile communication (GSM) network. A network operator may need to pay vendors for licensing to use the SCG for terminating voice over Long Term Evolution (VoLTE) calls. The SCG may be included in the terminating VoLTE calls and potentially voice over NR (VoNR) call flows, which may contribute to unnecessary call setup delays and additional points of failures. The SCG may be involved for every call termination, even when not needed, which may unnecessarily consume resources at the SCG, thereby affecting an overall system performance.

In some implementations, the SCG may be included in a call delivery path when the SCG is needed (e.g., only when a subscriber is actually roaming in the GSM network). The SCG may be used when the UE is roaming and where there is no VoLTE roaming agreement, such that a subscriber may be redirected to GSM (e.g., the UE is not VoLTE capable). When the subscriber is IMS registered and supports VoLTE, the SCG may not be used in the call delivery path. The SCG may be used in the call delivery path only when the SCG is needed, instead of using the SCG for every terminating VoLTE call. By selectively invoking the SCG in certain situations, overall SCG traffic may be reduced, application and licensing costs may be reduced, and call setup delays for terminating VoLTE/VoNR calls may be reduced since a CSCF (e.g., an S-CSCF) may eliminate the SCG from terminating IMS based call flows.

Figure 1:
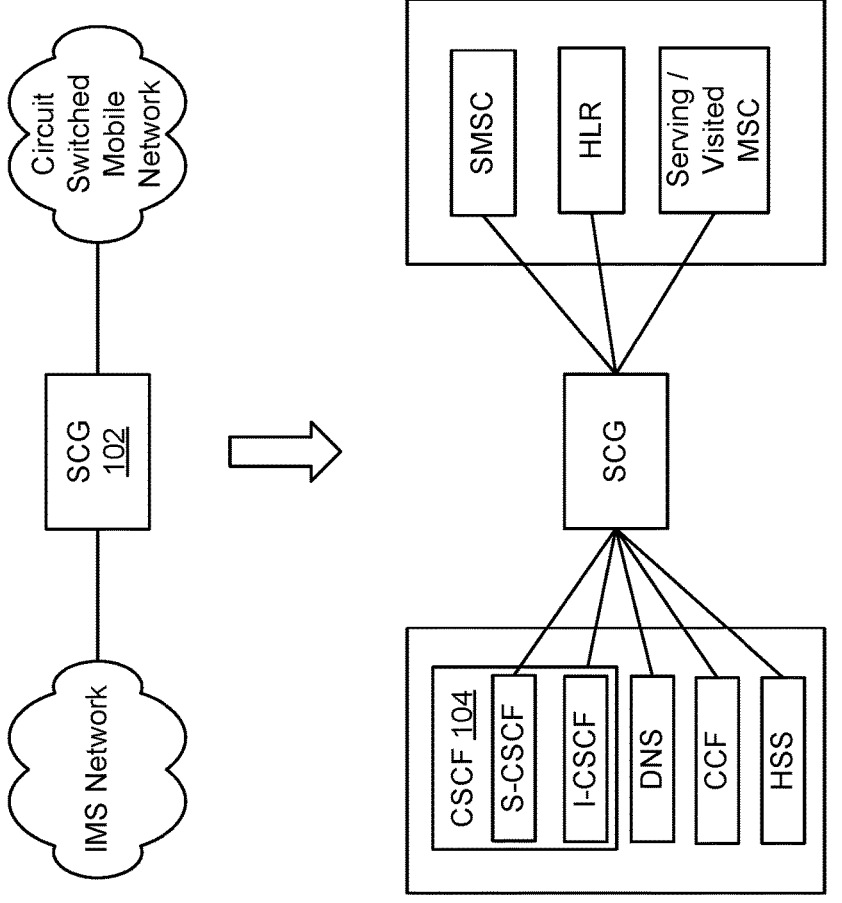
FIG. 1 is a diagram of an example associated with a service continuity gateway (SCG).

FIG. 1 is a diagram of an example 100 associated with an SCG.

As shown in FIG. 1, an SCG 102 may act as a gateway between a circuit switched mobility network and an IMS network. The circuit switched (CS) mobility network may be a CDMA network, a GSM network, or a universal mobile telecommunications service (UMTS) network. The IMS network may be a Fourth Generation (4G) Long Term Evolution (LTE) network or a Fifth Generation (5G) network. The SCG 102 may support anchoring, domain transfer, and call delivery for dual mode UEs. The SCG 102 may provide origination call anchoring and domain selection for terminating call delivery. The SCG 102 may not be invoked for originating calls placed while using voice over LTE (VoLTE), but a CSCF 104 may send all inbound/terminated calls to the SCG 102 so that the SCG 102 may determine whether the call should be delivered as a VoIP call or a circuit switched call. When voice over IMS delivery fails or times out, the SCG 102 may automatically try to deliver the call via the circuit switched mobility network.

As shown in FIG. 1, various entities of the circuit switched mobile network and various entities of the IMS network may communicate with the SCG 102. For example, in the circuit switched mobile network, a short message service center (SMSC), a home location register (HLR), and/or a serving/visited mobile switching center (MSC) may communicate with the SCG 102. In the IMS network, a serving CSCF (S-CSCF), an interrogating CSCF (I-CSCF), a domain name system (DNS), a charging collection function (CCF), and/or a home subscriber service (HSS) may communicate with the SCG 102.

As indicated above, FIG. 1 is provided as an example. Other examples may differ from what is described with regard to FIG. 1.

Figure 2A:
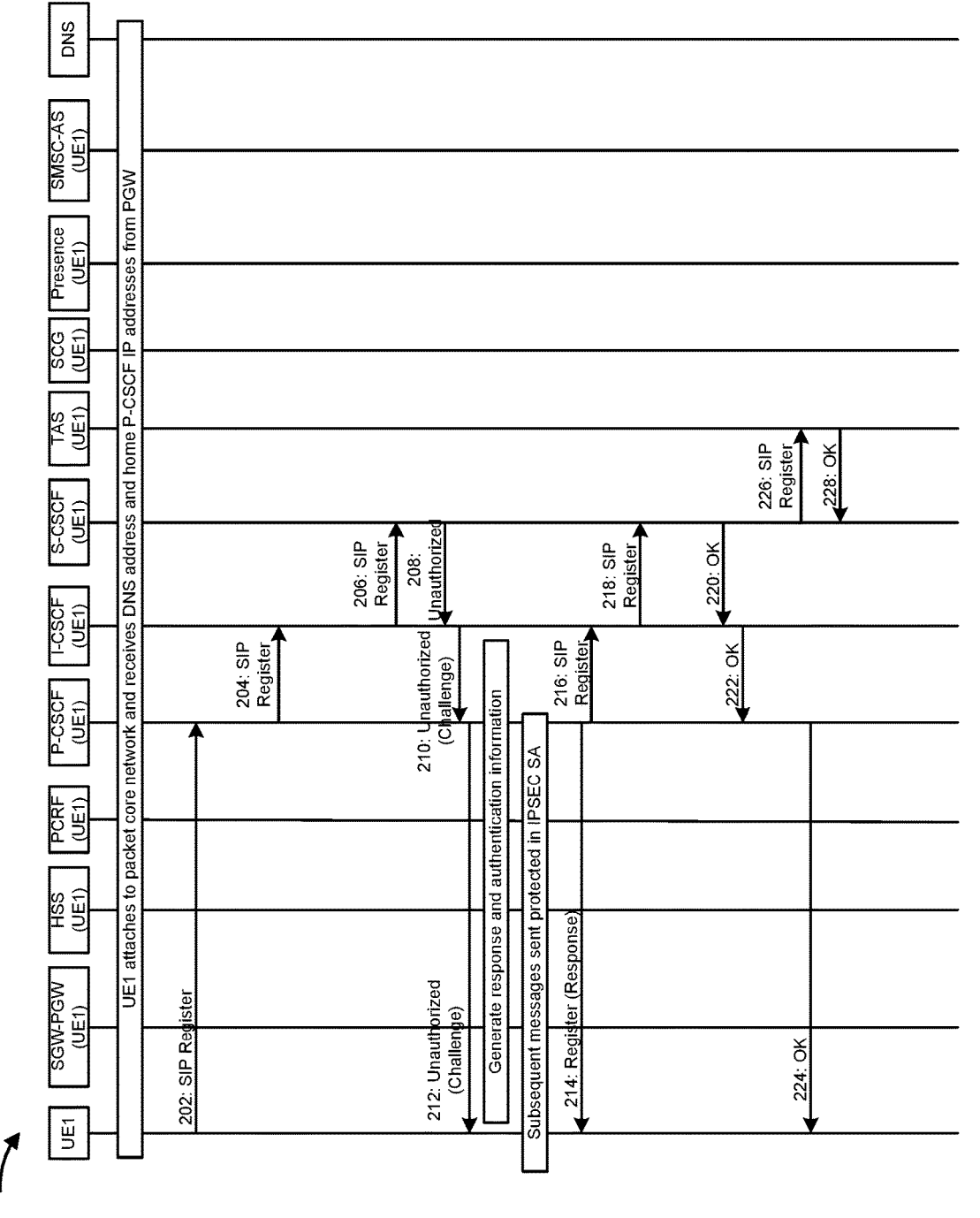
FIGS. 2A-2B are diagrams of examples associated with an Internet Protocol (IP) multimedia subsystem (IMS) registration.
Figure 2B:
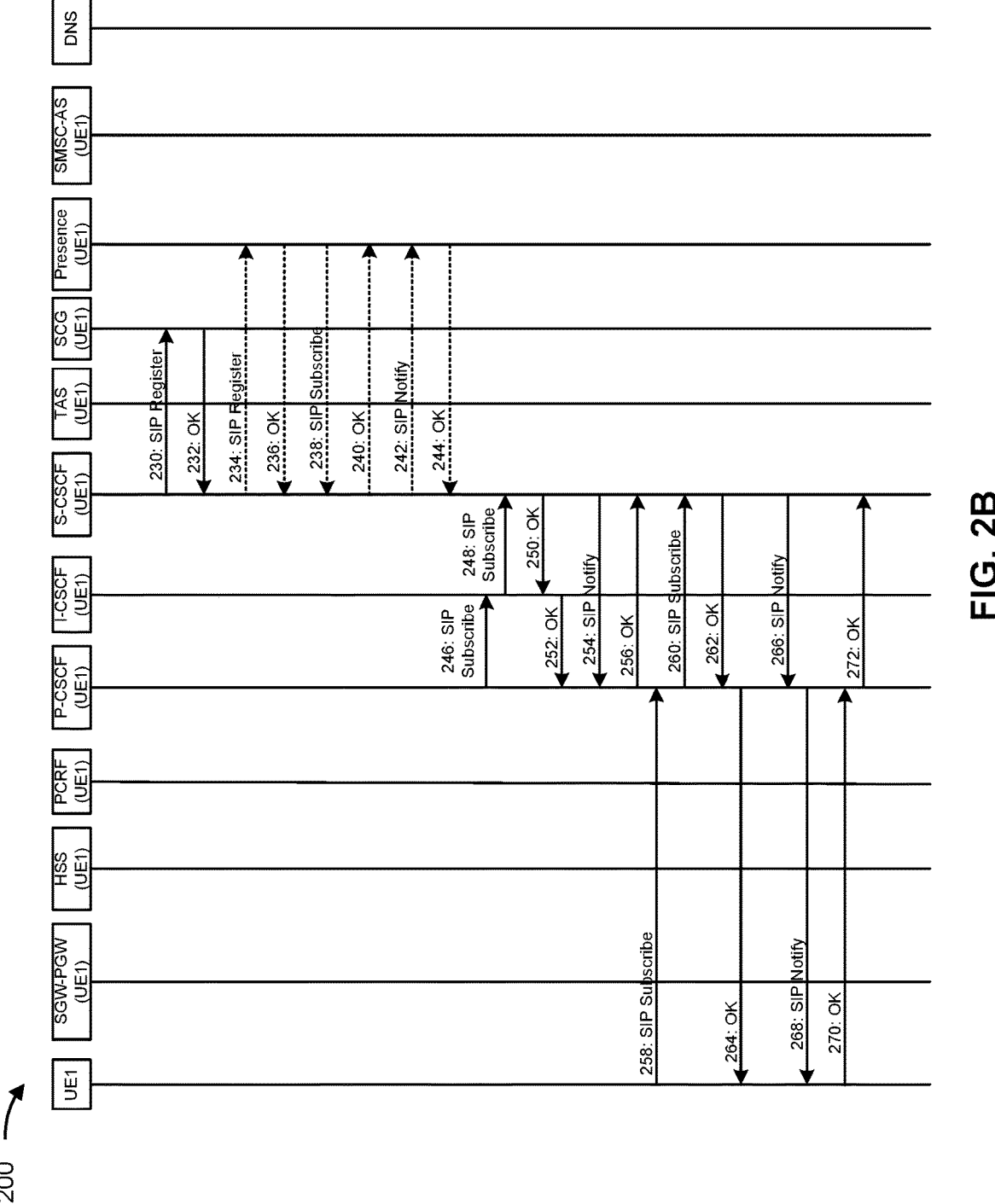

FIGS. 2A-2B are diagrams of an example 200 associated with an IMS registration. As shown in FIGS. 2A-2B, example 200 includes a UE (UE1) in an originating network, a packet gateway (PGW), an HSS, a policy and charging rules function (PCRF), a proxy CSCF (P-CSCF), an I-CSCF, an S-CSCF, a telephony application server (TAS), an SCG (e.g., SCG 102), a presence entity, an SMSC, and a DNS.

As shown in FIG. 2A, during an IMS registration, the UE may attach to a packet core network, such as a serving gateway (SGW) and/or a PGW (SGW-PGW), and the UE may receive a DNS address and a home P-CSCF IP address from the PGW. As shown by reference number 202, the UE may transmit a session initiation protocol (SIP) register message to the P-CSCF. As shown by reference number 204, the P-CSCF may transmit the SIP register message to the I-CSCF. The I-CSCF may select an appropriate S-CSCF based on a capability set of the UE returned by the HSS and local configurations at the I-CSCF. For an IMS phase, all S-CSCFs may have the same capabilities so that local preference may be used. As shown by reference number 206, the I-CSCF may transmit the SIP register message to the S-CSCF. As shown by reference number 208, the S-CSCF may transmit an unauthorized message (e.g., 401 unauthorized) to the I-CSCF. As shown by reference number 210, the I-CSCF may transmit the unauthorized message (challenge) to the P-CSCF. As shown by reference number 212, the P-CSCF may transmit the unauthorized message to the UE. The PGW, the HSS, the PCRF, and/or the P-CSCF may generate a response and authentication information. Subsequent messages that are transmitted may be protected using IP security (IPSEC) security association (SA).

As shown by reference number 214, the UE may transmit a SIP register message (response) to the P-CSCF. As shown by reference number 216, the P-CSCF may transmit the SIP register message to the I-CSCF. As shown by reference number 218, the I-CSCF may transmit the SIP register message to the S-CSCF. Based on filter criteria, the S-CSCF may send a third-party registration to one or more application servers.

As shown by reference number 220, the S-CSCF may transmit an OK message (e.g., a 200 OK response) to the I-CSCF. As shown by reference number 222, the I-CSCF may transmit the OK message to the P-CSCF. As shown by reference number 224, the P-CSCF may transmit the OK message to the UE. At this point, the UE may be registered in an IMS. As shown by reference number 226, the S-CSCF may transmit the SIP register message to the TAS. As shown by reference number 228, the TAS may transmit an OK message to the S-CSCF.

As shown in FIG. 2B, and by reference number 230, the S-CSCF may transmit the SIP register message to the SCG. The S-CSCF may transmit an SCG IMS SIP registration to the SCG, so that the SCG may be aware that a user is registered with an IMS packet switched (PS) domain. As a default setting, the S-CSCF may transmit the SIP register message to the SCG for every call termination, even though the SCG may not necessarily be needed for the call termination. For example, the SCG may not be needed when the UE is not roaming. As shown by reference number 232, the SCG may transmit an OK message to the S-CSCF. Further, the SCG may query the HSS for subscriber subscription information, such as roaming capabilities. For example, the SCG may transmit a profile update request to the HSS in order to query the HSS for the subscriber subscription information.

As shown by reference number 234, the S-CSCF may transmit the SIP register message to the presence entity. As shown by reference number 236, the presence entity may transmit an OK message to the S-CSCF. As shown by reference number 238, the presence entity may transmit a SIP subscribe message (registration event) to the S-CSCF. As shown by reference number 240, the S-CSCF may transmit an OK message to the presence entity. As shown by reference number 242, the S-CSCF may transmit a SIP notify message (registration event) to the presence entity. As shown by reference number 244, the presence entity may transmit an OK message to the S-CSCF.

As shown by reference number 246, the P-CSCF may transmit a SIP subscribe message to the I-CSCF. As shown by reference number 248, the I-CSCF may transmit the SIP subscribe message to the S-CSCF. As shown by reference number 250, the S-CSCF may transmit an OK message to the I-CSCF. As shown by reference number 252, the I-CSCF may transmit the OK message to the P-CSCF. As shown by reference number 254, the S-CSCF may transmit a SIP notify message to the P-CSCF. As shown by reference number 256, the P-CSCF may transmit an OK message to the S-CSCF.

As shown by reference number 258, the UE may transmit a SIP subscribe message to the P-CSCF. As shown by reference number 260, the P-CSCF may transmit the SIP subscribe message to the S-CSCF. As shown by reference number 262, the S-CSCF may transmit an OK message to the P-CSCF. As shown by reference number 264, the P-CSCF may transmit the OK message to the UE. As shown by reference number 266, the S-CSCF may transmit a SIP notify message to the P-CSCF. As shown by reference number 268, the P-CSCF may transmit the SIP notify message to the UE. As shown by reference number 270, the UE may transmit an OK message to the P-CSCF. As shown by reference number 272, the P-CSCF may transmit the OK message to the S-CSCF.

In the IMS registration, by default, the SCG may be involved in every call termination in a wireless network, where the SCG may act as a gateway between a circuit switched mobility network and an IMS network. Since the SCG may be involved in very call termination, a relatively large number of SCG licenses may be needed to support a relatively large number of call terminations in the wireless network. Further, the SCG may need to be maintained in order to support the relatively large number of call terminations in the wireless network. In some cases, as described herein, the SCG may be bypassed when the UE is not roaming, and thereby not connected to the circuit switched mobility network. Since the UE is not roaming, the SCG may be avoided because no gateway to the circuit switched mobility network may be needed.

An LTE device supporting IMS authentication and key agreement (AKA) authentication may use IMS AKA authentication over IPSEC for the IMS registration in LTE coverage and enhanced high-rate packet data (eHRPD) coverage. Initially, the LTE device not supporting IPSEC may use another authentication (e.g., Digest-AKA-v2 authentication) in LTE coverage and eHRPD coverage until IPSEC is supported.

As indicated above, FIGS. 2A-2B are provided as examples. Other examples may differ from what is described with regard to FIGS. 2A-2B.

Figure 3:
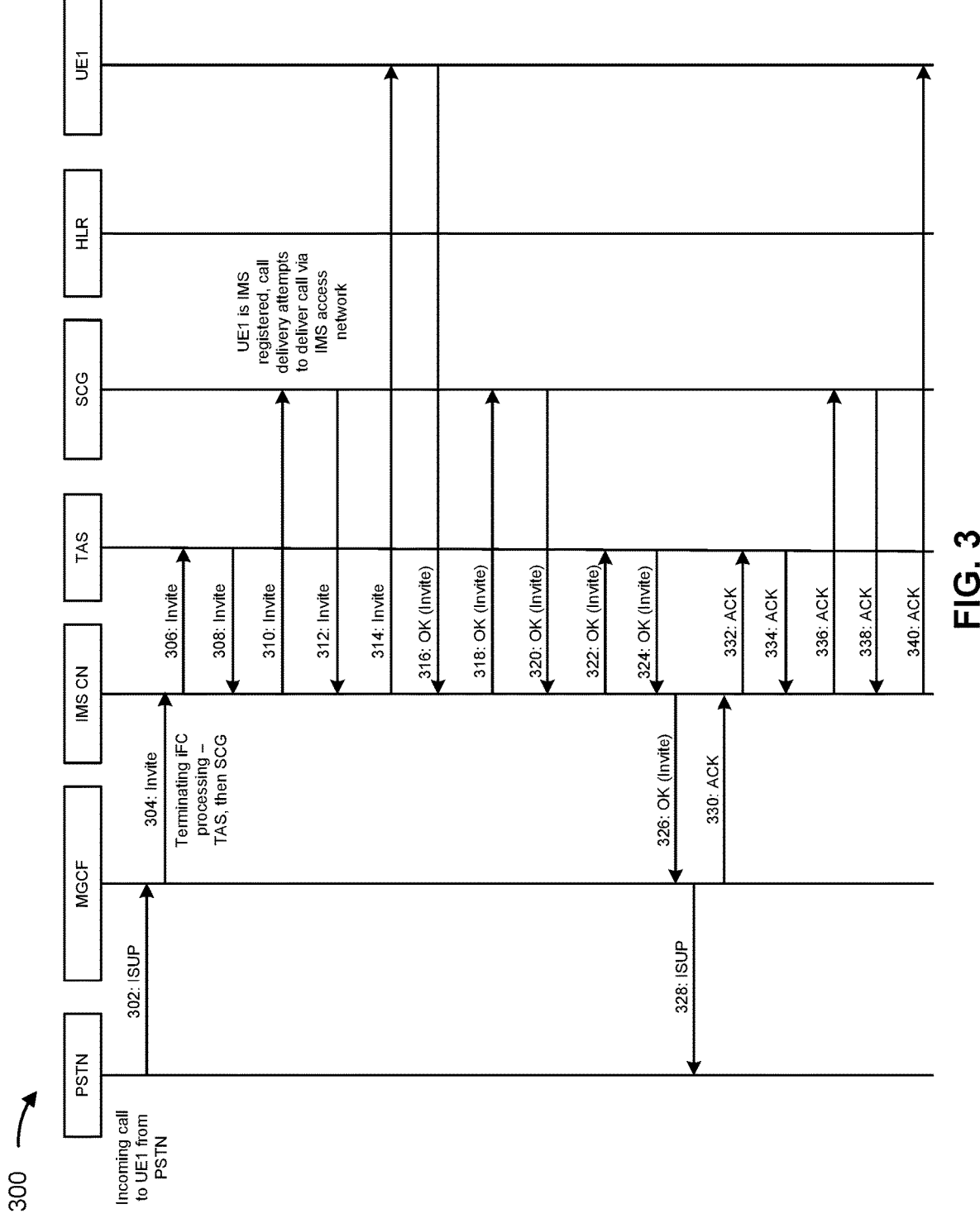
FIG. 3 is a diagram of an example associated with session initiation protocol (SIP) invite messaging in an IMS home network.

FIG. 3 is a diagram of an example 300 associated with SIP invite messaging in an IMS home network. As shown in FIG. 3, example 300 includes a public switched telephone network (PSTN), a media gateway control function (MGCF), an IMS core network (CN) which may include a CSCF (e.g., CSCF 104), a TAS, an SCG (e.g., SCG 102), an HLR, and a UE (e.g., UE2) in a terminating network.

As shown by reference number 302, based on an incoming call to the UE from the PSTN, the PSTN may transmit an integrated services digital network (ISDN) user part (ISUP) message to the MGCF. The ISUP message may indicate an initial address message (IAM) (UE-DN). As shown by reference number 304, the MGCF may transmit a SIP invite message to the IMS CN. As shown by reference number 306, the IMS CN may transmit the SIP invite message to the TAS. As shown by reference number 308, the TAS may transmit the SIP invite message to the IMS CN. As shown by reference number 310, the IMS CN may transmit the SIP invite message to the SCG. The UE may be IMS registered, and a call delivery may attempt to deliver a call via an IMS access network. As shown by reference number 312, the SCG may transmit the SIP invite message to the IMS CN.

A transmission of the SIP invite message from the MGCF to the IMS CN may be followed by a terminating initial filter criteria (iFC) processing involving the TAS and then the SCG. The IMS CN may transmit the SIP invite message to the TAS. When the incoming call is to the UE from the PSTN, the SIP invite message may traverse the CSCF. An S-CSCF in the ISM CN may transmit the SIP invite message to the TAS and the SCG based on a defined iFC. Every call termination may be sent to the SCG, even when a subscriber is not roaming. In a majority of cases, subscribers may be on LTE networks, especially in the United States, where a call to the SCG is superfluous and the signaling may waste network resources.

As shown by reference number 314, the IMS CN may transmit the SIP invite message to the UE. As shown by reference number 316, the UE may transmit an OK message (200 OK (Invite)) to the IMS CN. As shown by reference number 318, the IMS CN may transmit the OK message to the SCG. As shown by reference number 320, the SCG may transmit the OK message to the IMS CN. As shown by reference number 322, the IMS CN may transmit the OK message to the TAS. As shown by reference number 324, the TAS may transmit the OK message to the IMS CN. As shown by reference number 326, the IMS CN may transmit the OK message to the MGCF. As shown by reference number 328, the MGCF may transmit an ISUP message to the PSTN. The ISUP message may indicate an answer message (ANM).

As shown by reference number 330, the MGCF may transmit an acknowledgement (ACK) to the IMS CN. As shown by reference number 332, the IMS CN may transmit the ACK to the TAS. As shown by reference number 334, the TAS may transmit the ACK to the IMS CN. As shown by reference number 336, the IMS CN may transmit the ACK to the SCG. As shown by reference number 338, the SCG may transmit the ACK to the IMS CN. As shown by reference number 340, the IMS CN may transmit the ACK to the UE.

As indicated above, FIG. 3 is provided as an example. Other examples may differ from what is described with regard to FIG. 3.

Figure 4:
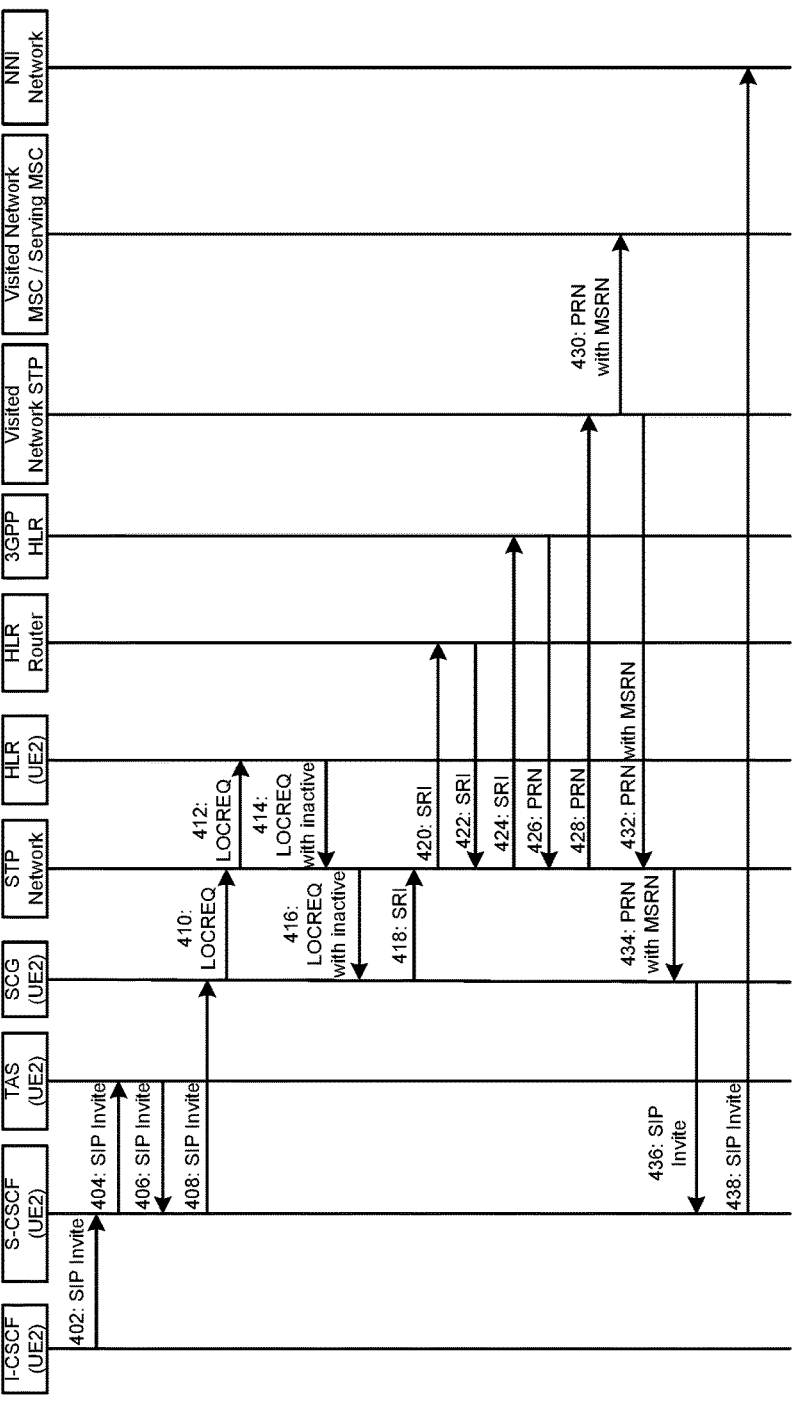
FIG. 4 is a diagram of an example associated with SIP invite and SS7 messaging to a non-IMS network.

FIG. 4 is a diagram of an example 400 associated with SIP invite messaging to a non-IMS network. As shown in FIG. 4, example 400 includes an I-CSCF, an S-CSCF, a TAS, an SCG (e.g., SCG 102), a signal transfer point (STP) in a signaling system 7 (SS7) network, an HLR, an HLR router, a Third Generation Partnership Project (3GPP) HLR, a visited network STP, a visited network MSC or serving MSC, and a network-to-network interface (NNI) network or a regional network. The I-CSCF, the S-CSCF, the TAS, the SCG, and the HLR may be associated with a UE (e.g., UE2 in a terminating network). The I-CSCF and the S-CSCF may be associated with a CSCF (e.g., CSCF 104).

As shown by reference number 402, the I-CSCF may transmit a SIP invite message to the S-CSCF. As shown by reference number 404, the S-CSCF may transmit the SIP invite message to the TAS. As shown by reference number 406, the TAS may transmit the SIP invite message to the S-CSCF. As shown by reference number 408, the S-CSCF may transmit the SIP invite message to the SCG. As shown by reference number 410, the SCG may transmit a location request (LOCREQ) to the STP. As shown by reference number 412, the STP may transmit the location request to the HLR. As shown by reference number 414, the HLR may transmit a location response (inactive) to the STP. As shown by reference number 416, the STP may transmit the location response to the SCG. When a subscriber is not found in an IMS, the SCG may query the HLR in order to deliver a call to a circuit switch network.

As shown by reference number 418, the SCG may transmit a send routing information (SRI) message to the STP. As shown by reference number 420, the STP may transmit the SRI message to the HLR router. As shown by reference number 422, the HLR router may transmit the SRI message to the STP. As shown by reference number 424, the STP may transmit the SRI message to the 3GPP HLR. As shown by reference number 426, the 3GPP HLR may transmit a provide roaming number (PRN) message to the STP. As shown by reference number 428, the STP may transmit the PRN message to the visited network STP. As shown by reference number 430, the visited network STP may transmit a PRN response with a mobile station roaming number (MSRN). As shown by reference number 432, the visited network STP may transmit the PRN response with the MSRN to the STP. As shown by reference number 434, the STP may transmit the PRN response with the MSRN to the SCG. As shown by reference number 436, the SCG may transmit a SIP invite message (e.g., with "TO:<MSRN>") to the S-CSCF. As shown by reference number 438, the S-CSCF may transmit the SIP invite message to the NNI network or the regional network.

As indicated above, FIG. 4 is provided as an example. Other examples may differ from what is described with regard to FIG. 4.

In some implementations, a CSCF may identify information associated with a UE. The information may indicate an IMS registration status associated with the UE. The IMS registration status may indicate whether or not the UE is registered with an IMS network. The information may indicate a location associated with the UE. The CSCF may determine, based on the information, whether the UE is roaming in a circuit switched mobility network. The circuit switched mobility network may be a GSM network. The circuit switched mobility network may be associated with a terminating network. The CSCF may transmit signaling associated with delivering a call to the UE, where the signaling may bypass an SCG on a call delivery path or the signaling may traverse the SCG on the call delivery path, based on whether the UE is roaming in the circuit switched mobility network. For example, when the CSCF determines that the UE is not roaming in the circuit switched mobility network, the UE may transmit signaling that bypasses the SCG on the call delivery path. As another example, when the CSCF determines that the UE is roaming in the circuit switched mobility network, the UE may transmit signaling that traverses the SCG on the call delivery path. When the UE is not remaining, the SCG may be avoided because no gateway to the circuit switched mobility network may be needed, which may avoid unnecessary signaling to the SCG. On the other hand, when the UE is remaining, the SCG may be used because a gateway to circuit switched mobility network may be needed.

In some implementations, the CSCF may receive, from a TAS, a flag indicating whether the UE is roaming in the circuit switched mobility network. The flag may be set based on a subscriber profile in an HSS, where roaming may be activated or deactivated in the subscriber profile based on a code. The UE may be set to not roaming as a default setting. The CSCF may receive the flag in a SIP invite message. The CSCF may transmit signaling associated with delivering a call to the UE. The signaling may bypass the SCG on the call delivery path or the signaling may traverse the SCG on the call delivery path based on whether the UE is roaming in the circuit switched mobility network. For example, when the UE receives a flag indicating that the UE is not roaming in the circuit switched mobility network, the UE may transmit signaling that bypasses the SCG on the call delivery path. As another example, when the UE receives a flag indicating that the UE is roaming in the circuit switched mobility network, the UE may transmit signaling that traverses the SCG on the call delivery path. In other words, the SCG may be used in the call delivery path based on the UE roaming in the circuit switched mobility network.

In some implementations, a mechanism may be defined to only include the SCG in the call delivery path when the SCG is needed (e.g., only when a subscriber is actually roaming in the GSM network). The SCG may be used when the UE is roaming and where there is no VoLTE roaming agreement, such that a subscriber may be redirected to GSM (e.g., the UE is not VoLTE capable). When the subscriber is IMS registered and supports VoLTE, the SCG may not be used in the call delivery path. The SCG may be used in the call delivery path only when the SCG is needed, instead of using the SCG for every terminating VoLTE call. By selectively invoking the SCG in certain situations, overall SCG traffic may be reduced, application and licensing costs may be reduced, and call setup delays for terminating VoLTE/VoNR calls may be reduced since a CSCF (e.g., an S-CSCF) may eliminate the SCG from terminating IMS based call flows.

Figure 5:
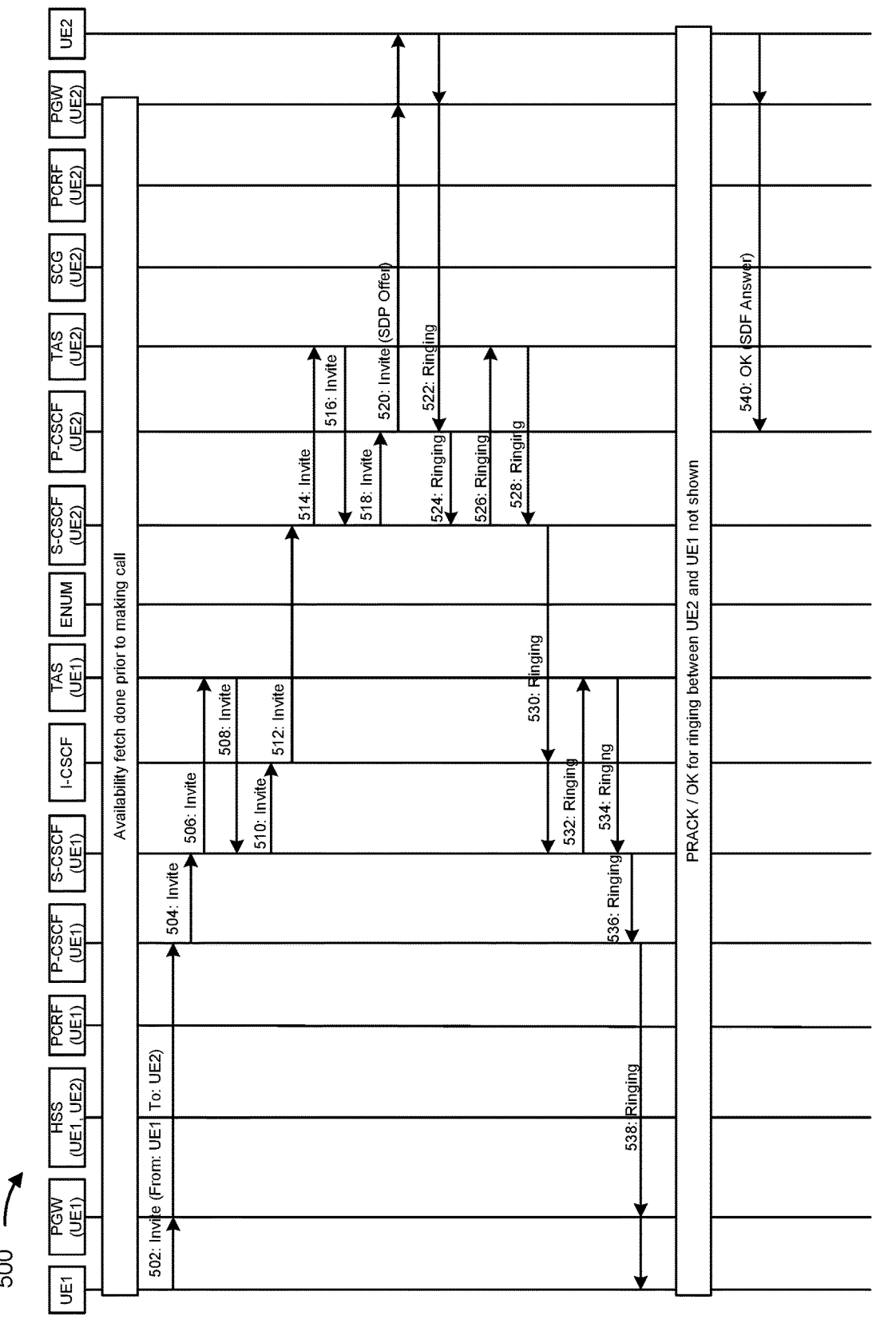
FIG. 5 is a diagram of an example associated with bypassing an SCG based on roaming status and roaming agreement.

FIG. 5 is a diagram of an example 500 associated with bypassing an SCG based on roaming status and roaming agreement (e.g., the SCG may be skipped when a UE is IMS registered and supports VoLTE). As shown in FIG. 5, example 500 includes a first UE (UE1), a PGW (UE1), an HSS (UE1, UE2), a PCRF (UE1), a P-CSCF (UE1), an S-CSCF (UE1), an I-CSCF, a TAS (UE1), an enumeration (ENUM) entity, an S-CSCF (U2), a P-CSCF (UE2), a TAS (UE2), an SCG (UE2), a PCRF (UE2), a PGW (UE2), and a second UE (UE2).

As shown by reference number 502, the first UE may transmit a SIP invite message to the PGW (UE1). The SIP invite message may indicate that UE1 is associated with an origination and that UE2 is associated with a termination (e.g., from UE1 to UE2). The SIP invite message may indicate a session description protocol (SDP) offer. The PGW (UE1) may transmit the SIP invite message to the P-CSCF (UE1). As shown by reference number 504, the P-CSCF (UE1) may transmit the SIP invite message to the S-CSCF (UE1). As shown by reference number 506, the S-CSCF (UE1) may transmit the SIP invite message to the TAS (UE1). As shown by reference number 508, the TAS (UE1) may transmit the SIP invite message to the S-CSCF (UE1). As shown by reference number 510, the S-CSCF (UE1) may transmit the SIP invite message to the I-CSCF. As shown by reference number 512, the I-CSCF may transmit the SIP invite message to the S-CSCF (UE2). As shown by reference number 514, the S-CSCF (UE2) may transmit the SIP invite message to the TAS (UE2). The S-CSCF (UE2) may determine to not transmit the SIP invite message to the SCG based on information associated with the second UE. For example, the S-CSCF (UE2) may store information regarding an IMS registration status of the second UE, location information associated with the second UE, and/or a UE capability associated with the second UE. Based on the IMS registration status, the location information, and/or the UE capability, the S-CSCF (UE2) may determine that the SCG may be bypassed, so the S-CSCF (UE2) may not transmit the SIP invite message to the SCG.

As shown by reference number 516, the TAS (UE2) may transmit the SIP invite message to the S-CSCF (UE2).

As shown by reference number 518, the S-CSCF (UE2) may transmit the SIP invite message to the P-CSCF (UE2). As shown by reference number 520, the P-CSCF (UE2) may transmit the SIP invite message (SDP offer) to the PGW (UE2). The PGW (UE2) may transmit the SIP invite message to the second UE. As shown by reference number 522, the second UE may transmit a ringing message (180 Ringing) to the PGW (UE2). The PGW (UE2) may transmit the ringing message to the P-CSCF (UE2). As shown by reference number 524, the P-CSCF (UE2) may transmit the ringing message to the S-CSCF (UE2). As shown by reference number 526, the S-CSCF (UE2) may transmit the ringing message to the TAS (UE). As shown by reference number 528, the TAS (UE) may transmit the ringing message to the S-CSCF (UE2). As shown by reference number 530, the S-CSCF (UE2) may transmit the ringing message to the I-CSCF. The I-CSCF may transmit the ringing message to the P-CSCF (UE1).

As shown by reference number 532, the S-CSCF (UE2) may transmit the ringing message to the TAS (UE1). As shown by reference number 534, the TAS (UE1) may transmit the ringing message to the S-CSCF (UE1). As shown by reference number 536, the S-CSCF (UE1) may transmit the ringing message to the P-CSCF (UE1). As shown by reference number 538, the P-CSCF (UE1) may transmit the ringing message to the PGW (UE1). The PGW (UE1) may transmit the ringing message to the first UE. An OK message for a ringing between the first UE and the second UE may be employed. As shown by reference number 540, the second UE may transmit an OK message (e.g., 200 OK) to the PGW (UE2). The OK message may indicate an SDP answer. The PGW (UE2) may transmit the OK message to the P-CSCF (UE2).

In some implementations, the SCG may be removed from a call delivery path when a subscriber is not roaming in a circuit switched mobility network. An iFC may be bypassed, such that the S-CSCF (UE2) may no longer transmit the SIP invite message to the SCG (UE2). The S-CSCF may no longer send a call to the SCG (UE2) by bypassing the iFC. The S-CSCF may include logic to only invoke the SCG when the SCG is needed (e.g., when a subscriber is actually roaming in a GSM network). The S-CSCF may be able to determine information associated with the second UE, such as an IMS registration status and location information via a P-access-network-info (PANI) header, for example, and the UE's capability. The S-CSCF may bypass the SCG when the location information indicates that the second UE is located in a 4G network or in a 5G network (e.g., the location information indicates that the subscriber is registered in a 4G/5G network) or the UE is IMS registered and supports Voice Over Packet Switch. In some cases, an iFC for an INVITE may be modified, such that all or most call termination no longer needs to be routed to the SCG. As a result, the SCG may not need to be accessed for every call, which may save resources consumed by the SCG.

As indicated above, FIG. 5 is provided as an example. Other examples may differ from what is described with regard to FIG. 5. The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) shown in FIG. 5 may perform one or more functions described as being performed by another set of devices shown in FIG. 5.

In some implementations, a subscriber may be assumed to not be roaming by default, and an SCG may be included only when the subscriber is roaming. The subscriber may be assumed to always be in a home network by default (e.g., not roaming by default). When the subscriber is actually roaming, a subscriber device may activate GSM roaming capabilities to ensure that the SCG is included in a call delivery path to deliver a call accordingly. A mechanism (e.g., code) may provide the subscriber with a technique to activate or deactivate GSM roaming in a subscriber profile. An indication may be passed to a TAS when the subscriber profile is pulled from an HSS. Based on this indication, the TAS may add a flag to a SIP invite message that is transmitted to an S-CSCF. The flag may be added to indicate whether or not GSM roaming is supported. Based on the flag, the S-CSCF may make a decision as to whether or not to invoke the SCG on a call delivery path. As a result, when a UE is not roaming in GSM, the S-CSCF may not be required to route the call to the SCG, and thus, a resources expended on invoking the SCG may be reduced and a load on the network and the SCG may be reduced.

Figure 6:
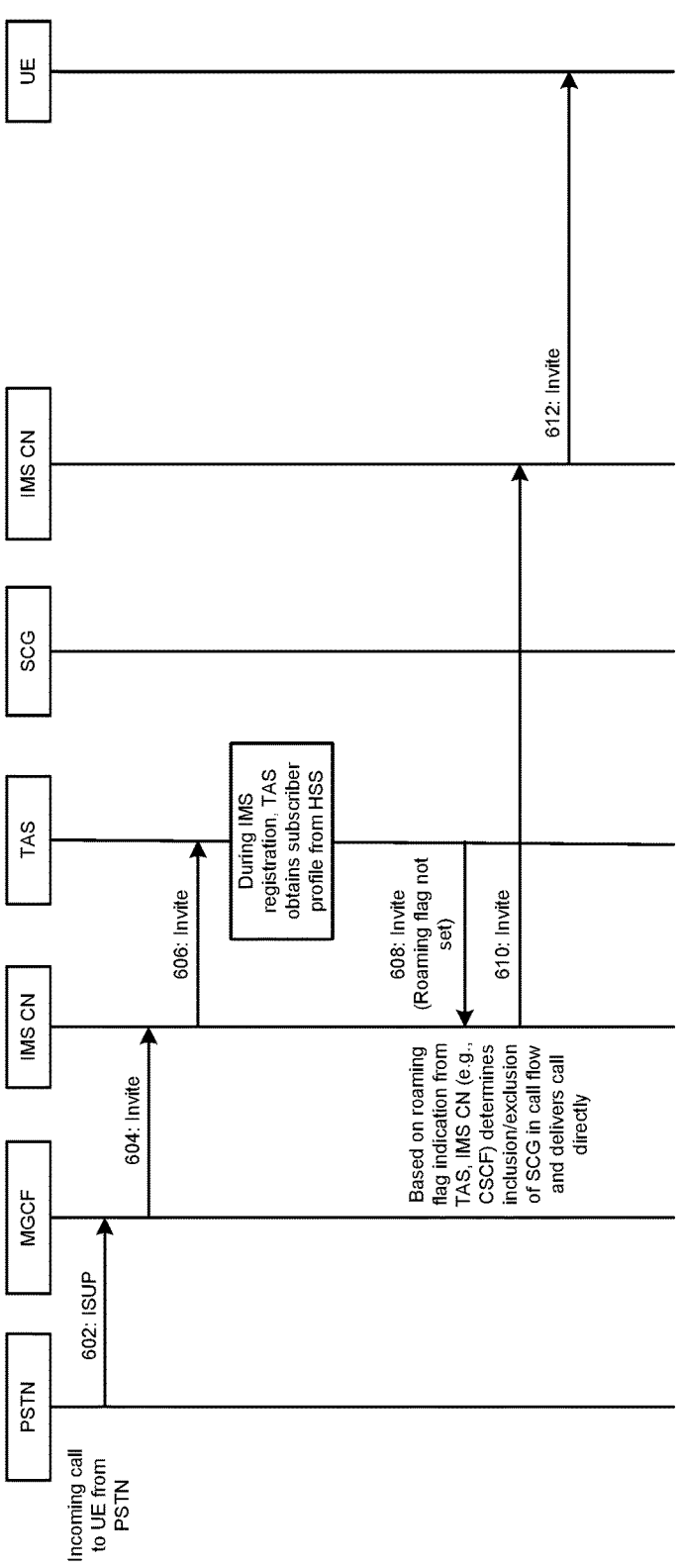
FIG. 6 is a diagram of an example associated with bypassing an SCG based on roaming status.

FIG. 6 is a diagram of an example 600 associated with bypassing an SCG based on roaming status. As shown in FIG. 6, example 600 includes a PSTN, an MGCF, a first IMS CN, a TAS, an SCG, a second IMS CN, and a UE.

As shown by reference number 602, based on an incoming call to the UE from the PSTN, the PSTN may transmit an ISUP message to the MGCF. The ISUP message may indicate an IAM (UE-DN). As shown by reference number 604, the MGCF may transmit a SIP invite message to the first IMS CN. The SIP invite message may indicate an SDP offer. As shown by reference number 606, the first IMS CN may transmit the SIP invite message to the TAS. A terminating iFC processing may involve the TAS, but no iFC may be defined for the SCG. During an IMS registration, the TAS may obtain a subscriber profile from the HSS. As shown by reference number 608, the TAS may transmit the SIP invite message to the first IMS CN. A roaming flag may not be set in the SIP invite message. The roaming flag may not be set based on the subscriber profile obtained from the HSS. Based on a roaming flag indication from the TAS, the first IMS CN (e.g., a CSCF associated with the first IMS CN) may determine whether to include/exclude the SCG in a call flow and/or deliver a call directly. As shown by reference number 610, the first IMS CN may transmit the SIP invite message to the second IMS CN. As shown by reference number 612, the second IMS CN may transmit the SIP invite message to the UE.

As indicated above, FIG. 6 is provided as an example. Other examples may differ from what is described with regard to FIG. 6. The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) shown in FIG. 6 may perform one or more functions described as being performed by another set of devices shown in FIG. 6.

Figure 7:
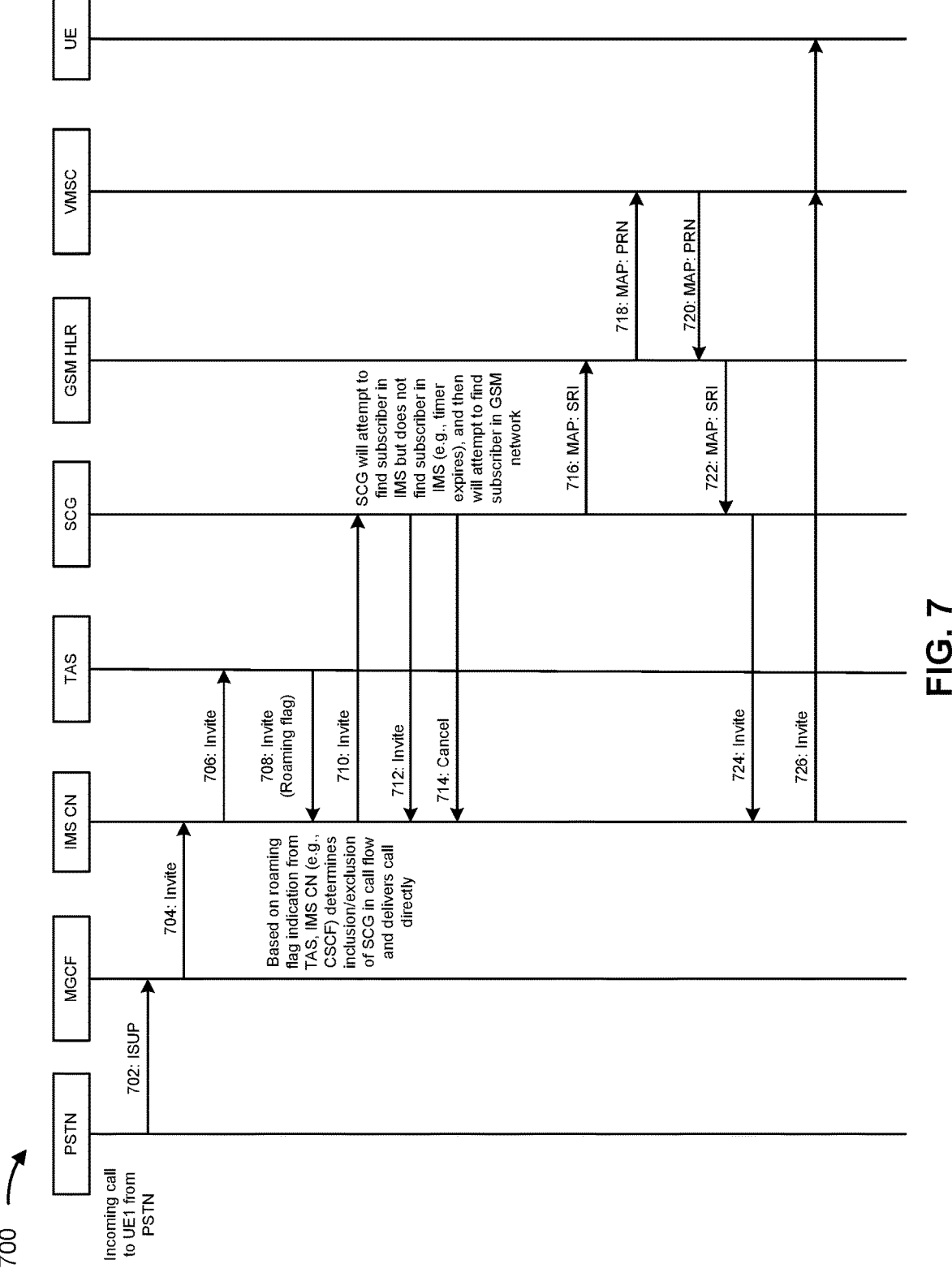
FIG. 7 is a diagram of an example illustrating calls to the SCG.

FIG. 7 is a diagram of an example 700 associated with inclusion of an SCG based on roaming support of the UE. As shown in FIG. 7, example 700 includes a PSTN, an MGCF, an IMS CN, a TAS, an SCG, a GSM HLR, a visited mobile switching center (VMSC), and a UE.

As shown by reference number 702, based on an incoming call to the UE from the PSTN, the PSTN may transmit an ISUP message to the MGCF. The ISUP message may indicate an IAM (UE-DN). As shown by reference number 704, the MGCF may transmit a SIP invite message to the first IMS CN. The SIP invite message may indicate an SDP offer. As shown by reference number 706, the first IMS CN may transmit the SIP invite message to the TAS. A terminating iFC processing may involve the TAS, but no iFC may be defined for the SCG. As shown by reference number 708, the TAS may transmit the SIP invite message to the first IMS CN. A roaming flag may be set in the SIP invite message. Based on a roaming flag indication from the TAS, the first IMS CN (e.g., a CSCF associated with the first IMS CN) may determine whether to include/exclude the SCG in a call flow and/or deliver a call directly.

As shown by reference number 710, the first IMS CN may transmit the SIP invite message to the SCG, which may be based on the roaming flag indicating that the UE is roaming. When the UE is roaming, the UE may be connected to a circuit switched mobility network, so the SCG may need to be involved because the SCG acts as a gateway to the circuit switched mobility network. If the roaming flag was not set, meaning that the UE is not roaming, the first IMS CN would not transmit the SIP invite message to the SCG because the SCG would not be needed. As shown by reference number 712, the SCG may transmit the SIP invite message to the first IMS CN. As shown by reference number 714, the SCG may transmit a cancel message to the first IMS CN. The SCG may attempt to find a subscriber in an IMS, but when the SCG does not find the subscriber in the IMS (e.g., a timer expires), then the SCG may attempt to find the subscriber in a GSM network. As shown by reference number 716, the SCG may transmit an SRI message to the GSM HLR. As shown by reference number 718, the GSM HLR may transmit a PRN message to the VMSC. As shown by reference number 720, the VMSC may transmit a PRN response (MSRN) to the HLR. As shown by reference number 722, the GSM HLR may transmit an SRI response (MSRN) to the SCG. As shown by reference number 724, the SCG may transmit the SIP invite message to the first IMS CN. As shown by reference number 726, the first IMS CN may transmit the SIP invite message to the VMSC. The VMSC may transmit the SIP invite message to the UE.

As indicated above, FIG. 7 is provided as an example. Other examples may differ from what is described with regard to FIG. 7. The number and arrangement of devices shown in FIG. 7 are provided as an example. In practice, there may be additional devices, fewer devices, different devices, or differently arranged devices than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) shown in FIG. 7 may perform one or more functions described as being performed by another set of devices shown in FIG. 7.

Figure 8:
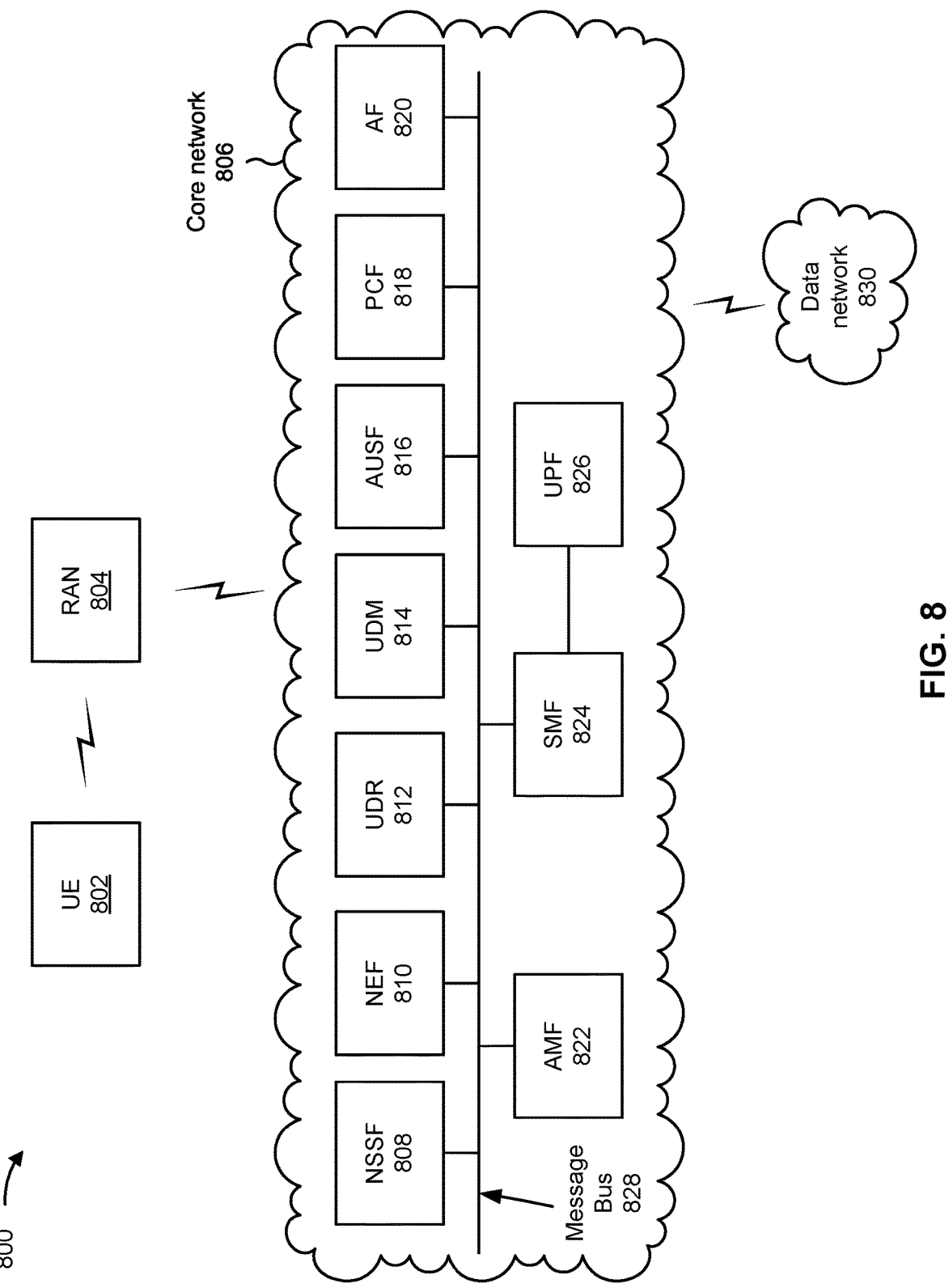
FIG. 8 is a diagram of an example environment in which systems and/or methods described herein may be implemented.

FIG. 8 is a diagram of an example environment 800 in which systems and/or methods described herein may be implemented. As shown in FIG. 8, example environment 800 may include a UE 802, a radio access network (RAN) 804, a core network 806, and a data network 830. Devices and/or networks of example environment 800 may interconnect via wired connections, wireless connections, or a combination of wired and wireless connections.

The UE 802 may include one or more devices capable of receiving, generating, storing, processing, and/or providing information, such as information described herein. For example, the UE 802 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 804 may support, for example, a cellular radio access technology (RAT). The RAN 804 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 802. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 804 may transfer traffic between the UE 802 (e.g., using a cellular RAT), one or more base stations (e.g., using a wireless interface or a backhaul interface, such as a wired backhaul interface), and/or the core network 806. The RAN 804 may provide one or more cells that cover geographic areas.

In some implementations, the RAN 804 may perform scheduling and/or resource management for the UE 802 covered by the RAN 804 (e.g., the UE 802 covered by a cell provided by the RAN 804). In some implementations, the RAN 804 may be controlled or coordinated by a network controller, which may perform load balancing, network-level configuration, and/or other operations. The network controller may communicate with the RAN 804 via a wireless or wireline backhaul. In some implementations, the RAN 804 may include a network controller, a self-organizing network (SON) module or component, or a similar module or component. In other words, the RAN 804 may perform network control, scheduling, and/or network management functions (e.g., for uplink, downlink, and/or side-link communications of the UE 802 covered by the RAN 804).

In some implementations, the core network 806 may include an example functional architecture in which systems and/or methods described herein may be implemented. For example, the core network 806 may include an example architecture of a 5G next generation (NG) core network included in a 5G wireless telecommunications system. While the example architecture of the core network 806 shown in FIG. 8 may be an example of a service-based architecture, in some implementations, the core network 806 may be implemented as a reference-point architecture and/or a 4G core network, among other examples.

As shown in FIG. 8, the core network 806 include a number of functional elements. The functional elements may include, for example, a network slice selection function (NSSF) 808, a network exposure function (NEF) 810, a unified data repository (UDR) 812, a unified data management (UDM) 814, an authentication server function (AUSF) 816, a policy control function (PCF) 818, an application function (AF) 820, an access and mobility management function (AMF) 822, a session management function (SMF)

824, and/or a user plane function (UPF) 826. These functional elements may be communicatively connected via a message bus 828. Each of the functional elements shown in FIG. 8 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 808 may include one or more devices that select network slice instances for the UE 802. The NSSF 808 may allow an operator to deploy multiple substantially independent end-to-end networks potentially with the same infrastructure. In some implementations, each slice may be customized for different services. The NEF 810 may include one or more devices that support exposure of capabilities and/or events in the wireless telecommunications system to help other entities in the wireless telecommunications system discover network services.

The UDR 812 may include one or more devices that provide a converged repository, which may be used by network functions to store data. For example, a converged repository of subscriber information may be used to service a number of network functions. The UDM 814 may include one or more devices to store user data and profiles in the wireless telecommunications system. The UDM 814 may generate authentication vectors, perform user identification handling, perform subscription management, and perform other various functions. The AUSF 816 may include one or more devices that act as an authentication server and support the process of authenticating the UE 802 in the wireless telecommunications system.

The PCF 818 may include one or more devices that provide a policy framework that incorporates network slicing, roaming, packet processing, and/or mobility management, among other examples. The AF 820 may include one or more devices that support application influence on traffic routing, access to the NEF 810, and/or policy control, among other examples. The AMF 822 may include one or more devices that act as a termination point for non-access stratum (NAS) signaling and/or mobility management, among other examples. The SMF 824 may include one or more devices that support the establishment, modification, and release of communication sessions in the wireless telecommunications system. For example, the SMF 824 may configure traffic steering policies at the UPF 826 and/or may enforce UE internet protocol (IP) address allocation and policies, among other examples. The UPF 826 may include one or more devices that serve as an anchor point for intra-RAT and/or inter-RAT mobility. The UPF 826 may apply rules to packets, such as rules pertaining to packet routing, traffic reporting, and/or handling user plane QoS, among other examples. The message bus 828 may represent a communication structure for communication among the functional elements. In other words, the message bus 828 may permit communication between two or more functional elements.

The data network 830 may include one or more wired and/or wireless data networks. For example, the data network 830 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of example environment 800 may perform one or more functions described as being performed by another set of devices of example environment 800.

Figure 9:
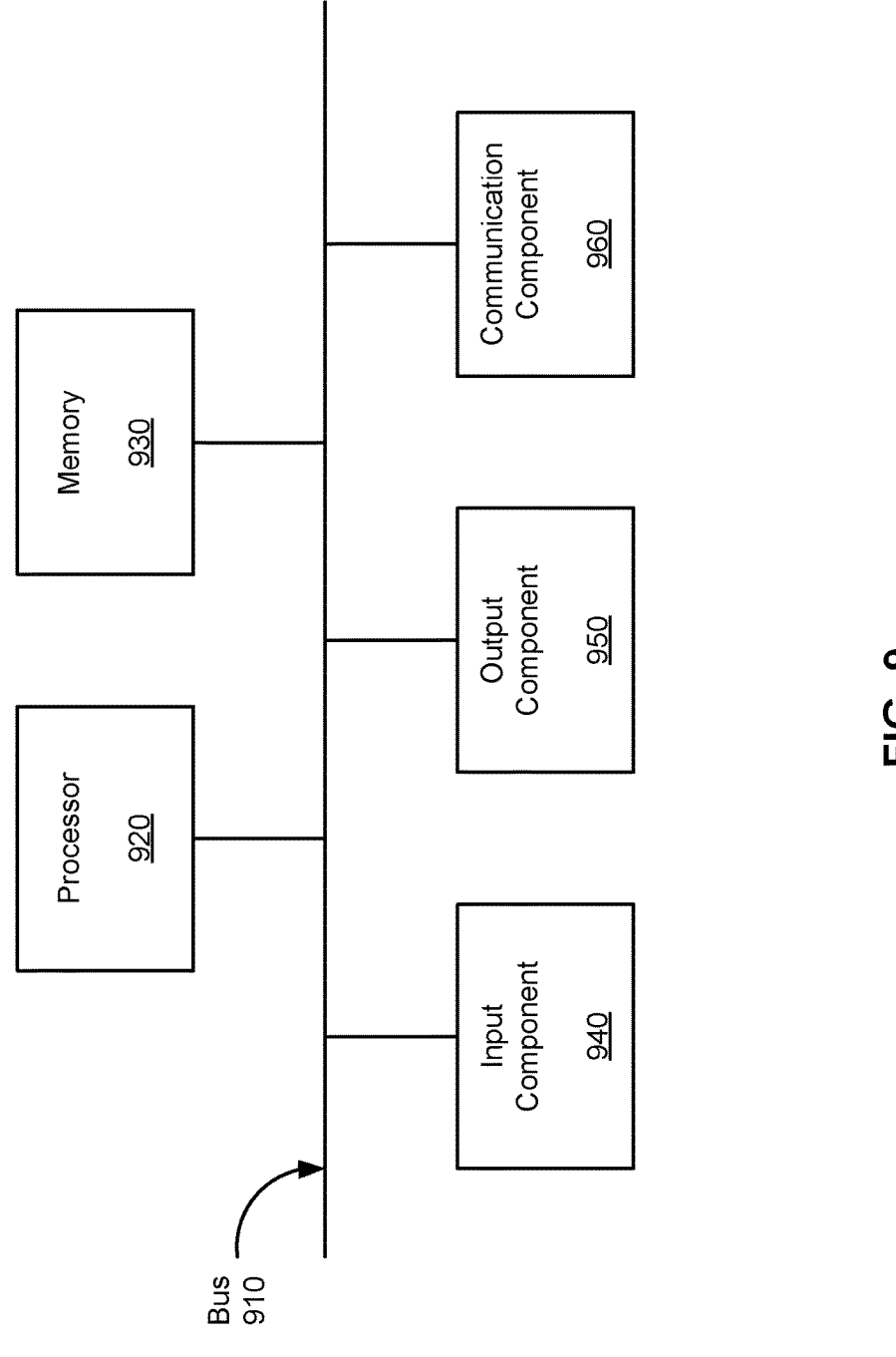
FIG. 9 is a diagram of example components of one or more devices of FIG. 8.

FIG. 9 is a diagram of example components of a device 900 associated with bypassing an SCG based on roaming status. The device 900 may correspond to an ISM entity (e.g., a CSCF). In some implementations, the ISM entity may include one or more devices 900 and/or one or more components of the device 900. As shown in FIG. 9, the device 900 may include a bus 910, a processor 920, a memory 930, an input component 940, an output component 950, and/or a communication component 960.

The bus 910 may include one or more components that enable wired and/or wireless communication among the components of the device 900. The bus 910 may couple together two or more components of FIG. 9, such as via operative coupling, communicative coupling, electronic coupling, and/or electric coupling. For example, the bus 910 may include an electrical connection (e.g., a wire, a trace, and/or a lead) and/or a wireless bus. The processor 920 may include a central processing unit, a graphics processing unit, a microprocessor, a controller, a microcontroller, a digital signal processor, a field-programmable gate array, an application-specific integrated circuit, and/or another type of processing component. The processor 920 may be implemented in hardware, firmware, or a combination of hardware and software. In some implementations, the processor 920 may include one or more processors capable of being programmed to perform one or more operations or processes described elsewhere herein.

The memory 930 may include volatile and/or nonvolatile memory. For example, the memory 930 may include random access memory (RAM), read only memory (ROM), a hard disk drive, and/or another type of memory (e.g., a flash memory, a magnetic memory, and/or an optical memory). The memory 930 may include internal memory (e.g., RAM, ROM, or a hard disk drive) and/or removable memory (e.g., removable via a universal serial bus connection). The memory 930 may be a non-transitory computer-readable medium. The memory 930 may store information, one or more instructions, and/or software (e.g., one or more software applications) related to the operation of the device 900. In some implementations, the memory 930 may include one or more memories that are coupled (e.g., communicatively coupled) to one or more processors (e.g., processor 920), such as via the bus 910. Communicative coupling between a processor 920 and a memory 930 may enable the processor 920 to read and/or process information stored in the memory 930 and/or to store information in the memory 930.

The input component 940 may enable the device 900 to receive input, such as user input and/or sensed input. For example, the input component 940 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 950 may enable the device 900 to provide output, such as via a display, a speaker, and/or a light-emitting diode. The communication component 960 may enable the device 900 to communicate with other devices via a wired connection and/or a wireless connection. For example, the communication component 960 may include a receiver, a transmitter, a transceiver, a modem, a network interface card, and/or an antenna.

The device 900 may perform one or more operations or processes described herein. For example, a non-transitory computer-readable medium (e.g., memory 930) may store a set of instructions (e.g., one or more instructions or code) for execution by the processor 920. The processor 920 may execute the set of instructions to perform one or more operations or processes described herein. In some implementations, execution of the set of instructions, by one or more processors 920, causes the one or more processors 920 and/or the device 900 to perform one or more operations or processes described herein. In some implementations, hardwired circuitry may be used instead of or in combination with the instructions to perform one or more operations or processes described herein. Additionally, or alternatively, the processor 920 may be configured to perform one or more operations or processes described herein. Thus, implementations described herein are not limited to any specific combination of hardware circuitry and software.

The number and arrangement of components shown in FIG. 9 are provided as an example. The device 900 may include additional components, fewer components, different components, or differently arranged components than those shown in FIG. 9. Additionally, or alternatively, a set of components (e.g., one or more components) of the device 900 may perform one or more functions described as being performed by another set of components of the device 900.

FIG. 10 is a flowchart of an example process 1000 associated with bypassing an SCG based on roaming status. In some implementations, one or more process blocks of FIG. 10 may be performed by an ISM entity, such as a CSCF. In some implementations, one or more process blocks of FIG. 10 may be performed by another entity or a group of entities separate from or including the IMS entity. Additionally, or alternatively, one or more process blocks of FIG. 10 may be performed by one or more components of device 900, such as processor 920, memory 930, input component 940, output component 950, and/or communication component 960.

As shown in FIG. 10, process 1000 may include identifying information associated with a UE (block 1010). The information may indicate an IMS registration status associated with the UE. The information may indicate a location associated with the UE. The information may be received via SIP invite message.

As shown in FIG. 10, process 1000 may include determining, based on the information, whether the UE is roaming in a circuit switched mobility network (block 1020). The UE may be associated with a terminating network. The circuit switched mobility network may be associated with a GSM network. For example, the UE may be roaming in the GSM network, or alternatively, the UE may not be roaming in the GSM network.

As shown in FIG. 10, process 1000 may include transmitting signaling associated with delivering a call to the UE, where the signaling may bypass an SCG on a call delivery path or the signaling may traverse the SCG on the call delivery path based on whether the UE is roaming in the circuit switched mobility network (block 1030). For example, the signaling may bypass the SCG on the call delivery path when the UE is not roaming in the circuit switched mobility network. As another example, the signaling may traverse the SCG on the call delivery path when the UE is roaming in the circuit switched mobility network.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   identifying, by a call session control function (CSCF), information associated with a user equipment (UE);
   determining, by the CSCF and based on the information, whether the UE is roaming in a circuit switched mobility network; and
   transmitting, by the CSCF, signaling associated with delivering a call to the UE, wherein the signaling bypasses a service continuity gateway (SCG) on a call delivery path when the UE is not roaming in the circuit switched mobility network and the signaling traverses the SCG on the call delivery path when the UE is roaming in the circuit switched mobility network.

2. The method of claim 1, wherein the information indicates an Internet Protocol multimedia subsystem (IMS) registration status associated with the UE.

3. The method of claim 1, wherein the information indicates a location associated with the UE.

4. The method of claim 1, wherein the CSCF is a serving CSCF (S-CSCF).

5. The method of claim 1, wherein the circuit switched mobility network is a global system for mobile communication (GSM) network.

6. The method of claim 1, wherein the circuit switched mobility network is a code-division multiple access (CDMA) network.

7. The method of claim 1, wherein the UE is associated with a terminating network.

8. A method, comprising:

receiving, by a call session control function (CSCF) and from a telephone application server (TAS), a flag indicating whether a user equipment (UE) is roaming in a circuit switched mobility network; and transmitting, by the CSCF, signaling associated with delivering a call to the UE, wherein the signaling bypasses a service continuity gateway (SCG) on a call delivery path when the UE is not roaming in the circuit switched mobility network and the signaling traverses the SCG on the call delivery path when the UE is roaming in the circuit switched mobility network.

9. The method of claim 8, wherein the flag is set based on a subscriber profile in a home subscriber service (HSS), and roaming is activated or deactivated in the subscriber profile based on a code.

10. The method of claim 8, wherein the UE is set to not roaming as a default setting, and the SCG is used in the call delivery path based on the UE roaming in the circuit switched mobility network.

11. The method of claim 8, wherein the flag is received in a session initiation protocol (SIP) invite message.

12. The method of claim 8, wherein the circuit switched mobility network is a global system for mobile communication (GSM) network.

13. The method of claim 8, wherein the circuit switched mobility network is a code-division multiple access (CDMA) network.

14. A device, comprising:

one or more processors configured to:

identify information associated with a user equipment (UE);

determine, based on the information, that the UE is not roaming in a global system for mobile communication (GSM) network; and transmit signaling associated with delivering a call to the UE, wherein the signaling bypasses a service continuity gateway (SCG) on a call delivery path based on the UE not roaming in the GSM network.

15. The device of claim 14, wherein the information indicates an Internet Protocol multimedia subsystem (IMS) registration status associated with the UE.

16. The device of claim 14, wherein the information indicates a location associated with the UE.

17. The device of claim 14, wherein the one or more processors are further configured to:

determine that the UE is roaming in the GSM network; and transmit signaling that traverses the SCG on the call delivery path based on the UE roaming in the GSM network.

18. The device of claim 14, wherein:

the device is a serving call session control function (S-CSCF); and the UE is associated with a terminating network.

19. The device of claim 14, wherein the UE is set to not roaming as a default setting.

* * * * *